US011038184B2

(12) United States Patent
Park et al.

(10) Patent No.: US 11,038,184 B2
(45) Date of Patent: Jun. 15, 2021

(54) POROUS SUPPORT HAVING EXCELLENT FILLING CHARACTERISTICS OF ION CONDUCTOR, METHOD FOR MANUFACTURING THE SAME, AND REINFORCED MEMBRANE INCLUDING THE SAME

(71) Applicant: KOLON FASHION MATERIAL. INC., Gwacheon-si (KR)

(72) Inventors: Jun Young Park, Gumi-si (KR); Chui Ki Kim, Gumi-si (KR); Sung Jin Kim, Gumi-si (KR); Ji Suk Baek, Gumi-si (KR); Heung Ryul Oh, Seoul (KR); Yong Hwan Lee, Daegu (KR); Hwan Kwon Rho, Gumi-si (KR)

(73) Assignee: KOLON FASHION MATERIAL. INC., Gwacheon-si (KR)

( * ) Notice: Subject to any disclaimer, the term of this patent is extended or adjusted under 35 U.S.C. 154(b) by 31 days.

(21) Appl. No.: 15/537,892

(22) PCT Filed: Dec. 14, 2015

(86) PCT No.: PCT/KR2015/013645
§ 371 (c)(1),
(2) Date: Jun. 20, 2017

(87) PCT Pub. No.: WO2016/105008
PCT Pub. Date: Jun. 30, 2016

(65) Prior Publication Data
US 2017/0365864 A1 Dec. 21, 2017

(30) Foreign Application Priority Data
Dec. 24, 2014 (KR) .................. 10-2014-0188484

(51) Int. Cl.
| | | |
|---|---|---|
| H01M 8/0289 | (2016.01) | |
| H01M 8/1062 | (2016.01) | |
| B01D 69/10 | (2006.01) | |
| H01M 4/62 | (2006.01) | |
| B01D 69/02 | (2006.01) | |
| B01D 39/16 | (2006.01) | |
| H01M 8/1018 | (2016.01) | |
| B01D 71/64 | (2006.01) | |
| B01D 67/00 | (2006.01) | |

(52) U.S. Cl.
CPC ...... *H01M 8/0289* (2013.01); *B01D 39/1623* (2013.01); *B01D 69/02* (2013.01); *B01D 69/10* (2013.01); *H01M 4/62* (2013.01); *H01M 8/1018* (2013.01); *H01M 8/1062* (2013.01); *B01D 67/0004* (2013.01); *B01D 71/64* (2013.01); *B01D 2239/025* (2013.01); *B01D 2239/0421* (2013.01); *B01D 2239/0631* (2013.01); *B01D 2239/1208* (2013.01); *B01D 2239/1216* (2013.01); *B01D 2239/1258* (2013.01); *B01D 2323/39* (2013.01); *B01D 2325/02* (2013.01); *B01D 2325/04* (2013.01); *B01D 2325/20* (2013.01); *B01D 2325/42* (2013.01); *H01M 2008/1095* (2013.01); *Y02P 70/50* (2015.11)

(58) Field of Classification Search
CPC .............. H01M 8/0282; H01M 8/1062; B01D 39/1623; B01D 60/10
See application file for complete search history.

(56) References Cited

FOREIGN PATENT DOCUMENTS

| | | | |
|---|---|---|---|
| KR | 10-2012-0127548 A | | 11/2012 |
| KR | 10-2012-0139066 A | | 12/2012 |
| KR | 10-2013-0069525 A | | 6/2013 |
| KR | 2013106074 | * | 9/2013 |
| KR | 2013106074 A | * | 9/2013 |
| KR | 10-2014-0092158 A | | 7/2014 |
| KR | 10-1451567 B1 | | 10/2014 |
| KR | 101451567 | * | 10/2014 |

OTHER PUBLICATIONS

International Searching Authority, International Search Report for PCT/KR2015/013645 dated Mar. 17, 2016 [PCT/ISA/210].

\* cited by examiner

*Primary Examiner* — Ula C Ruddock
*Assistant Examiner* — Thomas H. Parsons

(57) ABSTRACT

Disclosed is a porous support including fine porous structures formed between nanofibers, wherein the fine porous structures have a porosity of 50% to 90%, a pore size of 0.01 μm to 10 μm and an air permeability of 0.01 to 7 sec/100 cc·air, and the porous support has a thickness of 5 μm to 50 μm, a method of manufacturing the same and a reinforced membrane including the same.

9 Claims, No Drawings

POROUS SUPPORT HAVING EXCELLENT FILLING CHARACTERISTICS OF ION CONDUCTOR, METHOD FOR MANUFACTURING THE SAME, AND REINFORCED MEMBRANE INCLUDING THE SAME

CROSS REFERENCE TO RELATED APPLICATIONS

This application is a National Stage of International Application No. PCT/KR2015/013645, filed on Dec. 14, 2015, which claims priority from Korean Patent Application No. 10-2014-0188484, filed on Dec. 24, 2014, the contents of all of which are incorporated herein by reference in their entirety.

TECHNICAL FIELD

The present invention relates to a porous support, a method of manufacturing the same and a reinforced membrane including the same.

BACKGROUND ART

Due to wide surface area and excellent porosity, nanofibers are utilized in a variety of applications such as filters for water purification, filters for air purification, composite materials, separation membranes for cells and the like, in particular, in reinforced composite membranes used for fuel cells for vehicles.

Among them, the fuel cell is an electrochemical device operated using hydrogen and oxygen as fuels, which attracts much attention as a next-generation energy source owing to high energy efficiency and environmental-friendliness resulting from less discharge of pollutants.

Meanwhile, depending on the type of electrolyte membrane, the fuel cell is classified into an alkaline electrolyte fuel cell, a direct oxidation fuel cell, a polymer electrolyte membrane fuel cell (PEMFC) and the like. Of these, the polymer electrolyte membrane fuel cell operates based on a mechanism in which hydrogen ions ($H^+$) transfer from an oxidation electrode (anode) to a reduction electrode (cathode) via a polymer electrolyte membrane, thus generating electricity. In particular, this draws much attention because it has benefits of operating at room temperature and having an extremely short activation time compared to other fuel cells.

In this case, a single membrane including a polymer such as a fluorine- or hydrocarbon-based polymer as a conductor of hydrogen ions is used as a polymer electrolyte membrane used for polymer electrolyte membrane fuel cells. However, Nafion™ available from DuPont, which is the most generally used perfluorinated polymer for the single membrane, has drawbacks of high price, low mechanical shape stability and high membrane resistance due to high thickness.

Accordingly, in order to solve these drawbacks, reinforced membranes designed to have improved mechanical and shape stability by combining the polymer with an organic/inorganic substance, a porous support or the like are suggested. In particular, pore-filled membranes including porous supports impregnated with ion conductors are actively researched due to the advantages described above as well as price competiveness.

However, in this regard, the support generally used for pore-filled membranes is polytetrafluoroethylene (PTFE). The PTFE support has superior chemical resistance, but cannot sufficiently function due to low porosity and poor air permeability.

DISCLOSURE

Technical Problem

Therefore, the present invention has been made in view of the above problems, and it is one object of the present invention to provide a porous support with high porosity and excellent air permeability, a method of manufacturing the same and a composite reinforced membrane including the same.

Technical Solution

In accordance with the present invention, the above and other objects can be accomplished by the provision of a porous support including fine porous structures formed between nanofibers, wherein the fine porous structures have a porosity of 50% to 90%, a pore size of 0.01 μm to 10 μm and an air permeability of 0.01 to 7 sec/100 cc·air, and the porous support has a thickness of 5 μm to 50 μm.

In another aspect of the present invention, provided is a method of manufacturing a porous support including preparing an electrospinning solution, and electrospinning the prepared electrospinning solution to form, between nanofibers, fine porous structures having a porosity of 50% to 90%, a pore size of 0.01 μm to 10 μm, and an air permeability of 0.01 to 7 sec/100 cc·air, wherein the porous support has a thickness of 5 μm to 50 μm.

In yet another aspect of the present invention, provided is a reinforced membrane including the porous support according to the present invention and an ion exchange polymer filling pores of the porous support.

In addition, the technical solutions described above are not all features of the present invention. The features, advantages and effects of the present invention can be understood in more detail with reference to the following Best Mode.

Effects of the Invention

The present invention includes fine porous structures having low air permeability between nanofibers, thereby providing easy coating and/or impregnation of low-viscosity and medium-viscosity solutions as well as high-viscosity solutions, increasing the content of electrolyte in the porous support and offering excellent air permeability so that mobility of ions can be improved. As a result, efficiency of the reinforced membrane produced using the porous support can be remarkably improved.

Best Mode

First, terms used herein will be defined.

(1) As used herein, the term "nano" means nano-scale and covers a size of 1 μm or less.

(2) As used herein, the term "diameter" means a length of a short axis passing through the center of a fiber and the term "length" means a length of a long axis passing through the center of the fiber.

Hereinafter, embodiments of the present invention will be described in more detail. However, the embodiments of the present invention can be implemented in various forms and the scope of the present invention is not limited to the embodiments described herein. In addition, the embodiments of the present invention are provided in order to provide more complete explanation of the present invention for a person having ordinary knowledge in the field to which the present invention pertains.

As a result of repeated research to produce porous supports which have high porosity and excellent air permeability and thus easily secure properties of polymer electrolyte membranes having high power and high capacity, the present inventors found that the object can be accomplished since coating and/or impregnation of low- and medium-viscosity solutions as well as high-viscosity solutions are easy when fine porous structures formed between nanofibers have air permeability of 0.01 to 7 sec/100 cc·air, and completed the prevent invention based on this finding.

More specifically, the porous support of the present invention includes fine porous structures formed between nanofibers, wherein the fine porous structures have a porosity of 50% to 90%, a pore size of 0.01 μm to 10 μm, and an air permeability of 0.01 to 7 sec/100 cc and the porous support has a thickness of 5 μm to 50 μm.

First, the nanofibers preferably include a hydrocarbon-based polymer which exhibits superior chemical resistance and hydrophobicity, and is thus free from shape deformation by moisture under high humidity environments. Specifically, the hydrocarbon-based polymer may be selected from the group consisting of nylon, polyimide, polyaramide, polyetherimide, polyacrylonitrile, polyaniline, polyethylene oxide, polyethylene naphthalate, polybutylene terephthalate, styrene butadiene rubber, polystyrene, polyvinyl chloride, polyvinyl alcohol, polyvinylidene fluoride, polyvinyl butylene, polyurethane, polybenzoxazole, polybenzimidazole, polyamide-imide, polyethylene terephthalate, polyethylene, polypropylene, copolymers thereof and mixtures thereof. In particular, polyimide which exhibits relatively good heat resistance, chemical resistance and shape stability is preferably used.

As described above, when the nanofibers include polyimide as a hydrophobic polymer, in order to satisfy properties of the porous support such as time taken for saturated impregnation, moisture proportion, wettability obtained by wicking test and contact angle, the main chain of the polyimide may include any one hydrophilic substituent group selected from the group consisting of an amine group, a carboxylic group, a hydroxyl group and a combination thereof.

In this case, the polyimide can be prepared by polymerizing diamine, dianhydride and a comonomer containing a hydroxyl group to produce polyamic acid (PAA) and conducting imidization through a subsequent curing process. In addition, the polyamic acid can be prepared by an ordinary production method and specifically can be prepared by mixing diamine with a solvent, adding dianhydride thereto and polymerizing the same. The diamine is preferably an aromatic diamine and the dianhydride is preferably a fully aromatic polyimide using aromatic dianhydride.

In this case, in order for the main chain of the polyimide to include any one hydrophilic substituent group selected from the group consisting of an amine group, a carboxylic group, a hydroxyl group and a combination thereof, after production of the polyimide or the polyamic acid, the main chain of the polyimide or the polyamic acid can be replaced by the hydrophilic substituent group, or the polyimide can be prepared using the diamine and/or dianhydride including the hydrophilic substituent group, or the comonomer containing a hydroxyl group in addition to the diamine and the dianhydride can be used for polymerization. The comonomer containing a hydroxyl group may include one or more selected from the group consisting of dianiline containing a hydroxyl group, diphenyl urea containing a hydroxyl group, diamine containing a hydroxyl group and a combination thereof, but the present invention is not limited thereto.

In addition, when the main chain of polyimide includes a hydrophilic substituent group, as described above, the hydrophilic substituent group may be present in an amount of 0.01 to 0.1 mol %, preferably 0.01 to 0.08 mol %, more preferably 0.02 to 0.08 mol % with respect to the total amount of the polyimide. When the content of the hydrophilic substituent group is less than 0.01 mol %, hydrophilication may be insufficient due to decreased hydrophilic groups of the polyimide main chain and, when the content exceeds 0.1 mol %, disadvantageously, side-reactions occur, and physical strength and elongation may be deteriorated.

Next, conversion rate from polyimide to imide may be 90% or more, preferably 99% or more. Imide conversion rate can be obtained by measuring IR spectrum of the nanofibers, and calculating a ratio of imide C—N absorbance at 1,375 cm$^{-1}$ to p-substituted C—H absorbance at 1,500 cm$^{-1}$. When the imide conversion rate is less than 90%, physical properties and shape stability cannot be guaranteed due to unreacted substances.

Meanwhile, nanofibers including polyimide as described above have advantages of excellent heat resistance, chemical resistance and shape stability. However, they lack hydrophilic properties because it is a hydrophobic polymer. As a result, it is impossible to uniformly impregnate all the pores of the fine porous structures formed between nanofibers with a high amount of ionic conductive polymer and ionic conductivity may be deteriorated due to insufficient formation of hydrophilic channels. Accordingly, hydrophilication may be needed in order to improve physical properties of the porous support and a method well-known in the art may be used as the hydrophilication without any particular limitation.

As an example of the hydrophilic treatment, the nanofibers may include a hydrophilic additive. That is, the nanofibers themselves may include the hydrophilic additive, pores of the nanofibers may be impregnated with the hydrophilic additive, or one or two surfaces of the nanofibers may be coated with the hydrophilic additive.

More specifically, the nanofibers may include the hydrophilic additive in an amount of 0.1 to 20 parts by weight, preferably 0.5 to 20 parts by weight, more preferably 1 to 2 parts by weight, with respect to 100 parts by weight of the nanofiber polymer. When the content of the hydrophilic additive is less than 0.1 parts by weight, with respect to 100 parts by weight of the nanofiber polymer, performance of electrochemical devices may be deteriorated due to lack of hydrophilic performance and thus deteriorated wettability, and when the content exceeds 20 parts by weight, instability of nanofiber jet is increased during spinning and non-uniform fiber bundles are created, thus causing problems upon application to separation membranes for electrochemical devices.

As described above, because the nanofibers include a hydrophilic additive, they can exhibit excellent wettability. Therefore, the nanofibers can improve efficiency of fuels owing to excellent wettability to electrolytes when used as separation membranes for electrochemical devices. In addition, the porous support including nanofibers exhibits excellent durability, heat resistance and chemical resistance, thus maintaining performance of electrochemical devices under harsh operation conditions.

Here, the hydrophilic additive may be an inorganic or organic hydrophilic additive.

Any inorganic hydrophilic additive may be used without any limitation so long as it does not cause an oxidation and/or reduction reaction, i.e., an electrochemical reaction with a cathode or anode current collector within an operation voltage range of an electrochemical device (for example, in the case of a lithium secondary battery, 0 to 5V based on Li/Li$^+$), does not impair electrical conductivity and can endure the process of manufacturing nanofibers including the same. For example, the inorganic hydrophilic additive may include one or more selected from the group consisting of TiO$_2$ anatase, TiO$_2$ rutile, TiO$_2$ brookite, tin dioxide (SnO), zirconium dioxide (ZrO$_2$), aluminum dioxide (Al$_2$O$_3$) oxidized single-walled carbon nanotubes, oxidized multi-walled carbon nanotubes, oxidized graphite oxide, graphene oxide and a combination thereof, but the present invention is not limited thereto. Preferably, the inorganic hydrophilic additive is TiO$_2$.

In addition, any organic hydrophilic additive may be used without any limitation so long as it does not cause an oxidation and/or reduction reaction, i.e., an electrochemical reaction with a cathode or anode current collector within an operation voltage range of an electrochemical device (for example, in the case of a lithium secondary battery, 0 to 5V based on Li/Li$^+$), does not impair electrical conductivity and can endure the process of manufacturing nanofibers including the same. For example, the organic hydrophilic additive may include one or more selected from the group consisting of polyhydroxyethylmethacrylate, polyvinyl acetate, polyurethane, polydimethylsiloxane, polyimide, polyamide, polyethylene terephthalate, polymethylmethacrylate, epoxy and a combination thereof, but the present invention is not limited thereto.

In this case, the hydrophilic additive may be a nano hydrophilic additive. Accordingly, the hydrophilic additive may have a mean particle diameter of 0.005 to 1 μm, preferably 0.005 to 0.8 μm, more preferably 0.005 to 0.5 μm. When the mean particle diameter of the nano hydrophilic additive is less than 0.005 μm, nano hydrophilic particles may agglomerate, thus causing deterioration in hydrophilic effect or difficulty in handling, and when the mean particle diameter of the nano hydrophilic additive exceeds 1 μm, physical tensile strength of the support may be deteriorated and elongation at break may be decreased.

Meanwhile, preferably, the nanofibers according to the present invention have a mean diameter of 40 nm to 5000 nm in consideration of porosity of fine porous structures formed therebetween, the thickness of the porous support and so on. When the mean diameter of the nanofibers is less than 40 nm, mechanical strength of the porous support may be deteriorated and when the mean diameter of the nanofibers exceeds 5,000 nm, there are problems of significantly deteriorated porosity and increased thickness. In this case, the mean diameter means an average of 50 fiber diameters measured using a scanning electron microscope (JSM6700F, JEOL).

In addition, as described above, the porosity of fine porous structures formed between nanofibers may be 50% to 90%. As the fine porous structures have a porosity of 50% or more, the specific surface area of the porous support increases, which makes impregnation with an electrolyte easy when applied as a separation membrane. As a result, efficiency of cells can be improved. Meanwhile, the fine porous structures preferably have a porosity of 90% or less. This is because, when the porosity of the fine porous structures exceeds 90%, the subsequent process may be not performed smoothly due to deteriorated shape stability. In this case, the porosity can be calculated as a ratio of an air volume with respect to a total volume of the porous support in accordance with the following Equation 1. In this case, the total volume is calculated by producing a rectangular sample and measuring the width, length and thickness of the sample, and the air volume is obtained by measuring the weight of the sample and subtracting a polymer volume, calculated back from the density, from the total volume.

Porosity (%)=(air volume in nanofibers provided with fine porous structures/total volume of porous support)×100     [Equation 1]

Next, the pore size allowing for formation of the fine porous structures may be 0.01 μm to 10 μm or 0.01 μm to 8 μm. The pore size is determined so as to form a porous structure which can provide excellent air permeation rate. When the pore size is excessively large, physical strength may be deteriorated.

Meanwhile, the fine porous structures may have an air permeability of 0.01 to 7 sec/100 cc·air. In this case, air permeability (Gurley value) is a parameter showing air permeability of a membrane, which means a value measured using an air permeation tester (ASTM 0726-58) in this specification. More specifically, air permeability is time (seconds) for 100 cc of air to pass through a 1 square inch test specimen at a hydraulic pressure of 4.88 inches. Generally, as air permeability decreases, air permeability of the membrane improves.

In particular, the porous support of the present invention can be easily impregnated and/or coated with regard to an ion conductor solution having a low viscosity of about 1 to 1,000 cps, an ion conductor solution having a medium viscosity of about 1,000 to 10,000 cps as well as an ion conductor solution having a high viscosity of about 10,000 cps or more.

In particular, in the present invention, air permeability of the porous support can be increased to 5 sec/100 cc·air or more, preferably 10 sec/100 cc·air or more, more preferably 100 sec/100 cc·air or more, even more preferably 1000 sec/100 cc·air or more, specifically 5 to 10,000 sec/100 cc·air, when impregnated with an ion conductor solution having a high viscosity of about 10,000 cps or more. When air permeability is increased to 5 sec/100 cc·air or more after impregnation with a high-viscosity ionic conductor solution, the content of ionic conductor in the porous support is increased and mobility of ions can thus be increased.

In addition, the porous support may have a porosity of less than 10%, preferably less than 5%, specifically 5 to 10% after impregnation with an ion conductor solution having a high viscosity of about 10,000 cps or more. When the porous support has a porosity of less than 10% after impregnation with a high-viscosity ionic conductor solution, the ionic conductor is filled at a high filling rate, crossover is reduced and ionic selectivity is thus improved.

The impregnation with the ionic conductor solution may be carried out by dissolving an ionic conductor in a solvent to prepare an ionic conductor solution and supporting the porous support in the ionic conductor solution, but the present invention is not limited thereto. A variety of methods well-known in the art such as spraying, screen printing and doctor blade processes may be used.

In addition, impregnation with the ion conductor solution having a high viscosity of about 10,000 cps or more may be carried out at room temperature (25° C.) and at room temperature (1 atm) for a sufficient time until the porous support is not impregnated with the high-viscosity ionic conductor anymore, for example, for 1 hour after initiating impregnation, but the present invention is not limited thereto.

The ionic conductor solution can be prepared by dissolving the ionic conductor in a solvent.

In this case, the solvent may be N-methyl-2-pyrrolidinone (NMP), dimethylformamide (DMF), or dimethyl acetamide (DMA), but the present invention is not necessarily limited thereto.

The ionic conductor has the capability to conduct hydrogen ions which is the main function of the polymer electrolyte membrane. The ionic conductor is used as a polymer electrolyte membrane and any ionic conductor may be used without particular limitation so long as it is made of a polymer resin having the capability to conduct hydrogen ions.

Specifically, examples of the polymer resin include polymer resins having, at a side thereof, a cation exchange group selected from the group consisting of a sulfonic acid group, a carboxylic acid group, a phosphoric acid group, a phosphonic acid group and a derivative thereof. In addition, examples of the polymer resin include: fluoro-based polymers; and hydrocarbon-based polymers such as benzimidazole-, polyimide-, polyetherimide-, polyphenylenesulfide-, polysulfone-, polyethersulfone-, polyetherketone-, polyetheretherketone-, polyarylethersulfone-, polystyrene-, polyphosphazene- or polyphenylquinoxaline-based polymers.

Specifically, examples of the ionic conductor include, but are not limited to, fluoro-based polymers including poly (perfluorosulfonic acid), poly(perfluorocarboxylic acid), a copolymer of tetrafluoroethylene containing a sulfonic acid group and fluorovinylether, defluorinated polyetherketone sulfide or a mixture thereof; and hydrocarbon-based polymers including sulfonated polyimide (S-PI), sulfonated polyarylethersulfone (S-PAES), sulfonated polyetheretherketone (SPEEK), sulfonated polybenzimidazole (SPBI), sulfonated polysulfone (S-PSU), sulfonated polystyrene (S-PS), sulfonated polyphosphazene and a mixture thereof.

The ionic conductor may be present in an amount of 5 to 40% by weight with respect to the total weight of the ionic conductor solution. When the content of the ionic conductor is less than 5% by weight, the ionic conductor does not sufficiently fill pores of the porous support and more vacant areas are thus created and, when the content of the ionic conductor exceeds 40% by weight, the ionic conductor solution cannot fill the pores of the porous support due to excessively high viscosity of the ionic conductor solution.

After filling with the ionic conductor solution, the solvent in the ionic conductor solution is removed so that the pores in the porous support can be completely filled with the ionic conductor. Accordingly, the method may further include removing the solvent after filling with the ionic conductor, and the process of removing the solvent may be carried out in a hot air oven at 60 to 150° C. for 0.5 to 20 hours.

Then, the porous support of the present invention may have a mean thickness of 5 μm to 50 μm. When the thickness of the porous support is less than 5 μm, mechanical strength and dimensional stability may be significantly deteriorated when applied to a separation membrane, and when the thickness thereof exceeds 50 μm, resistance loss is increased, and weight reduction and integration may be deteriorated when applied to a separation membrane. More preferably, the thickness of the porous support ranges from 10 μm to 30 μm.

Next, a method of manufacturing the porous support according to the present invention includes: preparing an electrospinning solution; and electrospinning the prepared electrospinning solution to form fine porous structures having a porosity of 50% to 90%, a pore size of 0.01 μm to 10 μm, and an air permeability of 0.01 to 7 sec/100 cc·air between nanofibers, wherein the produced porous support has a thickness of 5 μm to 50 μm.

Here, the step of preparing the electrospinning solution aims to prepare a solution containing monomers to form nanofibers. For example, the solution can be prepared by dissolving diamine and dianhydride in a solvent.

In this case, the diamine may include one or more selected from the group consisting of 4,4'-oxydianiline (ODA), 1,3-bis(4-aminophenoxy)benzene (RODA), p-phenylene diamine (p-PDA), o-phenylene diamine (o-PDA) and a mixture thereof, but the present invention is not limited thereto.

Next, the dianhydride may include one or more selected from the group consisting of pyromellitic dianhydride (PMDA), 3,3',4,4'-benzophenonetetracarboxylic dianhydride (BTDA), 4,4'-oxydiphthalic anhydride (ODPA), 3,4,3',4'-biphenyltetracarboxylic dianhydride (BPDA), and bis (3,4-dicarboxyphenyl)dimethylsilane dianhydride (SiDA) and mixtures thereof, but the present invention is not limited thereto.

In addition, the solvent may be selected from the group consisting of m-cresol, N-methyl-2-pyrrolidone (NMP), dimethylformamide (DMF), dimethylacetamide (DMAc), dimethylsulfoxide (DMSO), acetone, diethyl acetate, tetrahydrofuran (THF), chloroform, γ-butyrolactone and mixtures thereof, but the present invention is not limited thereto.

Meanwhile, the step of forming fine porous structures can be carried out by electrospinning the electrospinning solution to produce polyamic acid nanofibers including fine porous structures, and imidizing the polyamic acid nanofibers to produce polyimide nanofibers.

In this case, the electrospinning can be carried out by a method well-known in the art and there is no particular limitation as to electrospinning method.

The fine porous structures formed by the aforementioned method have a porosity of 50% to 90%, a pore size of 0.01 μm to 10 μm and an air permeability of 0.01 to sec/100 cc·air, and the porous support may have a thickness of 5 μm to 50 μm. A detailed explanation thereof has been given above.

Next, the reinforced membrane according to the present invention includes a porous support and an ion exchange polymer filling pores of the porous support.

In this case, a method of filling pores of the porous support with the ion exchange polymer can be carried out by a method well-known in the art, for example, by impregnation. In this case, the impregnation may be carried out by dipping the porous support in a solution containing the ion exchange polymer. In addition, the ion exchange polymer may be formed by dipping an associated monomer or low molecular weight oligomer in the porous support and then polymerizing the same in-situ in the porous support.

In this case, the impregnation temperature and time may be affected by various parameters. For example, the impregnation temperature and time may be affected by the thickness of the nanofibers, concentration of the ion exchange polymer, the type of solvent, concentration of ion exchange polymer to impregnate the porous support and the like. The impregnation process may be carried out at a temperature of not less than a freezing point of the solvent and not higher than 100° C., more generally at room temperature to a temperature of 70° C. or lower. The temperature cannot be a melting point or higher of the nanofibers.

Next, any ion exchange polymer may be used without limitation so long as it is well-known in the art. More specifically, the ion exchange polymer may be a cation exchange polymer having a cation exchange group such as a proton, or an anion exchange polymer having an anion exchange group such as a hydroxyl ion, carbonate or bicarbonate.

When the ion exchange polymer fills pores of the porous support, a coating layer may be formed on one or two surfaces of the porous support during the production process. The thickness of the coating layer of the ion exchange polymer is preferably controlled to 30 μm or less. When the coating layer of the ion exchange polymer is formed to a thickness of higher than 30 μm on the surface of the porous support, the mechanical strength of the reinforced membrane may be deteriorated, the total thickness of the reinforced membrane is increased and resistance loss is thus increased.

The reinforced membrane according to the present invention includes a porous support having excellent air permeability and porosity, thereby exhibiting improved efficiency. Therefore, the reinforced membrane is preferably useful for a polymer electrolyte membrane for fuel cells or a membrane for reverse osmosis filters.

MODE FOR THE INVENTION

Hereinafter, embodiments according to the present invention will be described in detail to such an extent that a person having ordinary knowledge in the field to which the invention pertains can easily implement the invention. However, the present invention can be implemented in various forms and is not limited to embodiments stated herein.

Example 1-1

100 parts by weight of pyromellitic dianhydride (PMDA), oxydianiline (ODA) and phenylenediamine (PDA) monomers, and 5 parts by weight of nano $TiO_2$ anatase as a hydrophilic additive were dissolved in a dimethylformamide solution to prepare a 5 L spinning solution having a solid content of 12.5% by weight and a viscosity of 620 poise. The prepared spinning solution was transferred to a solution tank and then spun to produce polyamic acid nanofibers, and the polyamic acid nanofibers were transferred by a roll-to-roll method and heat-cured in a continuous curing furnace maintained at a temperature of 420° C. for 10 minutes to produce a porous support including the polyimide nanofibers. At this time, properties of the produced porous support are as follows.

Examples 1-2 to 1-4 and Comparative Example 1

Porous supports having properties shown in Table 1 were produced in the same manner as in Example 1.

Example 2-1

PMDA, ODA and PDA monomers were dissolved in a dimethylformamide solution to prepare a 5 L spinning solution having a solid content of 12.5% by weight and a viscosity of 620 poise. The prepared spinning solution was transferred to a solution tank, fed by a volumetric gear pump to a spinning chamber having 26 nozzles and to which a high voltage of 49 kV was applied and then spun to produce a polyamic acid nanoweb. At this time, the amount of the supplied solution was 1.0 ml/min.

Subsequently, the polyamic acid nanoweb was heat-cured in a continuous curing furnace maintained at a temperature of 420° C. for 10 minutes to produce a polyimide nanoweb.

Meanwhile, nano $TiO_2$ anatase as a hydrophilic additive was added to dimethylformamide, followed by stirring to prepare a hydrophilic additive solution. The produced nanoweb was dipped in the prepared hydrophilic additive solution at room temperature (20° C.) for 10 minutes and then dried in a hot air oven at 80° C. for 3 hours or longer. The dipping and drying processes were repeated 2 to 5 times to impregnate the nanoweb with the hydrophilic additive.

At this time, properties of the produced porous support are the same as in Example 1-1.

Example 2-2

PMDA, ODA and PDA monomers were dissolved in a dimethylformamide solution to prepare a 5 L spinning solution having a solid content of 12.5% by weight and a viscosity of 620 poise. The prepared spinning solution was transferred to a solution tank, fed by a volumetric gear pump to a spinning chamber having 26 nozzles and to which a high voltage of 49 kV was applied and then spun to produce a polyamic acid nanoweb. At this time, the amount of the supplied solution was 1.0 ml/min.

Subsequently, the polyamic acid nanoweb was heat-cured in a continuous curing furnace maintained at a temperature of 420° C. for 10 minutes to produce a polyimide nanoweb. Both surfaces of the produced polyimide nanoweb were treated with plasma at 20 W for 5 minutes using low-temperature plasma by feeding oxygen gas at a flow rate of 150 sccm to a plasma treatment chamber.

At this time, properties of the produced porous support are the same as in Example 1-1.

Example 2-3

PMDA, ODA and PDA monomers were dissolved in a dimethylformamide solution to prepare a 5 L spinning solution having a solid content of 12.5% by weight and a viscosity of 620 poise. The prepared spinning solution was transferred to a solution tank, fed by a volumetric gear pump to a spinning chamber having 26 nozzles and to which a high voltage of 49 kV was applied and then spun to produce a polyamic acid nanoweb. At this time, the amount of the supplied solution was 1.0 ml/min.

Subsequently, the polyamic acid nanoweb was heat-cured in a continuous curing furnace maintained at a temperature of 420° C. for 10 minutes to produce a polyimide nanoweb. Both surfaces of the produced polyimide nanoweb were sputtered using an RF sputter at a constant deposition power of 150 W and at a constant sample temperature of 200° C. for 10 minutes to form a $TiO_2$ inorganic layer.

At this time, properties of the produced porous support are the same as in Example 1-1.

Example 2-4

PMDA, ODA and PDA, and a diphenyl urea monomer containing a hydroxyl group were dissolved in a weight ratio of 50:45:5 in a dimethylformamide solution to prepare a 5 L spinning solution having a solid content of 12.5% by weight and a viscosity of 620 poise.

The prepared spinning solution was transferred to a solution tank, fed by a volumetric gear pump to a spinning chamber having 26 nozzles and to which a high voltage of 49 kV was applied and then spun to produce a polyamic acid nanoweb. At this time, the amount of the supplied solution was 1.0 ml/min.

Subsequently, the polyamic acid nanoweb was heat-cured in a continuous curing furnace maintained at a temperature of 420° C. for 10 minutes to produce a polyimide nanoweb.

At this time, properties of the produced porous support are the same as in Example 1-1.

TABLE 1

| Items | Example 1-1 | Example 1-2 | Example 1-3 | Example 1-4 | Comparative Example 1 |
|---|---|---|---|---|---|
| Thickness of porous support [μm] | 11.97 | 9.5 | 30.15 | 22.33 | 13.75 |

TABLE 1-continued

| Items | Example 1-1 | Example 1-2 | Example 1-3 | Example 1-4 | Comparative Example 1 |
|---|---|---|---|---|---|
| Mean air permeability [s] | 0.31607 | 1.4187 | 3.054 | 6.7128 | 14.443 |
| Mean pore size [μm] | 4.3864 | 1.6619 | 1.9779 | 0.4891 | 0.3977 |
| Maximum active pore size [μm] | 5.2197 | 1.8566 | 2.2852 | 1.0065 | 1.02 |

Test Example 1

The porous supports according to Examples and Comparative Example 1 were each bar-coated with low-viscosity, medium-viscosity and high-viscosity solutions. At this time, for the low-viscosity solution, the medium-viscosity solution and the high-viscosity solution, bar-coating was performed at a rate of 20-30 mm/s, 20-30 mm/s, and 20-30 mm/s, respectively.

Next, the air permeability and porosity of the porous support were measured. Air permeability was time (seconds) required for 100 cc of air to pass through a 1 square inch test specimen at a hydraulic pressure of 4.88 inches, which was measured using an air permeation tester (ASTM 0726-58). That is, 1 square inch specimens were produced from the porous supports according to Examples and Comparative Example 1 and then disposed between clamp plates. Then, a cylinder was dropped and a time required for 100 cc of air to pass through the cylinder at a hydraulic pressure of 4.88 inches was measured and results are shown in the following Table 2.

The assessment method is as follows. A case in which air permeability after coating is increased by 5 sec/100 cc·air or more and porosity in the fine porous structures is less than 10% is represented by '⊚', a case in which air permeability after coating is increased by 5 sec/100 cc·air or more, or porosity in the fine porous structures is less than 10% is represented by '○', and a case in which air permeability after coating is increased by less than 5 sec/100 cc·air or porosity in the fine porous structures is 10% or more is represented by 'Δ', and a case in which there is no variation in air permeability after impregnation is represented by 'X'.

In addition, air permeability of the porous support impregnated with the high-viscosity solution was measured and results are shown in the following Table 2.

TABLE 2

| Items | Low-viscosity 300 cps, Nafion dispersion (solid content 20%, room temperature) | Medium-viscosity 1000 cps, Nafion dispersion (solid content 20%, −15° C.) | High-viscosity 10000 cps, SPAES (solid content 20%, room temperature) | Variation in air permeability after high-viscosity solution impregnation (sec/100 cc · air) |
|---|---|---|---|---|
| Example 1-1 | ⊚ | ⊚ | ⊚ | +4054.6 |
| Example 1-2 | ⊚ | ⊚ | ⊚ | +1201.4 |
| Example 1-3 | ⊚ | ⊚ | ⊚ | +392.5 |
| Example 1-4 | ⊚ | ⊚ | ⊚ | +39.7 |
| Comparative Example 1 | ⊚ | ○ | Δ | +4.7 |
| Example 2-1 | ⊚ | ⊚ | ⊚ | +2917.5 |
| Example 2-2 | ⊚ | ⊚ | ⊚ | +6011.2 |
| Example 2-3 | ⊚ | ⊚ | ⊚ | +699.3 |
| Example 2-4 | ⊚ | ⊚ | ⊚ | +178.0 |

As can be seen from Table 2, in the case of the porous support according to Example having air permeability satisfying the range defined in the present invention, air permeability is excellent even after coating with low-viscosity, medium-viscosity and high-viscosity solutions and coating is easily conducted. On the other hand, in the case of the porous support according to Comparative Example 1 having air permeability not satisfying the range defined in the present invention, coating of a high-viscosity solution is not easily conducted due to high porosity in the high-viscosity solution.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

The present invention relates to a porous support, a method of manufacturing the same and a reinforced membrane including the same. The porous support includes fine porous structures having low air permeability formed between nanofibers, thereby providing easy coating and/or impregnation of low-viscosity and medium-viscosity solutions as well as high-viscosity solutions, thus increasing the content of electrolytes in the porous support and offering excellent air permeability so that mobility of ions can be improved. As a result, efficiency of the reinforced membrane produced using the porous support can be remarkably improved.

Owing to wide surface area and excellent porosity, the porous support is useful for a variety of applications such as filters for water purification, filters for air purification, composite materials, membranes for cells and the like, in particular, for reinforced composite membranes for fuel cells for cars.

The invention claimed is:

1. A porous support impregnated with an ion conductor solution comprising at least one of a fluoro-based polymer and a sulfonated polymer, and comprising fine porous structures formed between nanofibers,
    wherein the fine porous structures have a porosity of 50% to 90%, a pore size of 0.01 μm to 10 μm and an air permeability of 0.31607 to 7 sec/100 cc·air, and
    the porous support has a thickness of 5 μm to 50 μm,
    wherein the air permeability of the porous support is increased by 5 sec/100 cc·air or more when the porous support is impregnated with the ion conductor solution having a high viscosity of about 10,000 cps or more, or
    wherein the air permeability of the porous support is increased by 5 sec/100 cc·air or more when the porous support is impregnated with the ion conductor solution having a low viscosity of about 1 to 1.000 cps,
    wherein the porosity of the porous support is less than 10% when the porous support is impregnated with the ion conductor solution having a high viscosity of about 10,000 cps or more.

2. The porous support according to claim 1, wherein the nanofibers comprise 0.1 to 20 parts by weight of a hydrophilic additive, with respect to 100 parts by weight of the nanofiber polymer.

3. The porous support according to claim 1, wherein the nanofibers are polyimide nanofibers.

4. The porous support according to claim 3, wherein the hydrophilic group on the main chain of polyimide comprises any one substituent group selected from the group consisting of an amine group, a carboxylic group, a hydroxyl group and a combination thereof.

5. The porous support according to claim 4, wherein the polyimide is prepared by polymerizing diamine, dianhydride and a comonomer containing a hydroxyl group to prepare polyamic acid and then imidizing the polyamic acid.

6. The porous support according to claim 5, wherein the comonomer containing a hydroxyl group is any one selected from the group consisting of dianiline containing a hydroxyl group, diphenyl urea containing a hydroxyl group, diamine containing a hydroxyl group and a combination thereof.

7. A method of manufacturing a porous support comprising:
    preparing an electrospinning solution;
    electrospinning the prepared electrospinning solution to form, between nanofibers, fine porous structures having a porosity of 50% to 90%, a pore size of 0.01 μm to 10 μm, and an air permeability of 0.31607 to 7 sec/100 cc·air, and
    impregnating the fine porous structures with an ion conductor solution comprising at least one of a fluoro-based polymer and a sulfonated polymer,
    wherein the produced porous support has a thickness of 5 μm to 50 μm,
    wherein the air permeability of the porous support is increased by 5 sec/100 cc·air or more when the porous support is impregnated with the ion conductor solution having a high viscosity of about 10,000 cps or more, or
    wherein the air permeability of the porous support is increased by 5 sec/100 cc·air or more when the porous support is impregnated with the ion conductor solution having a low viscosity of about 1 to 1,000 cps,
    wherein the porosity of the porous support is less than 10% when the porous support is impregnated with the ion conductor solution having a high viscosity of about 10,000 cps or more.

8. The method according to claim 7, wherein the preparing the electrospinning solution comprises adding diamine and dianhydride to a solvent.

9. The method according to claim 7, wherein the forming the fine porous structures comprises:
    producing polyamic acid nanofibers including fine porous structures; and imidizing the polyamic acid nanofibers to produce polyimide nanofibers.

* * * * *